United States Patent
Nakajima

(10) Patent No.: US 10,828,895 B2
(45) Date of Patent: Nov. 10, 2020

(54) PRECISION INSTRUMENT, MOISTURE ABSORBENT USED THEREFOR, MANUFACTURING METHOD OF MOISTURE ABSORBENT, AND MANUFACTURING METHOD OF PRECISION INSTRUMENT

(71) Applicant: SEIKO EPSON CORPORATION, Tokyo (JP)

(72) Inventor: Yoshinori Nakajima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/397,732

(22) Filed: Apr. 29, 2019

(65) Prior Publication Data

US 2019/0329550 A1 Oct. 31, 2019

(30) Foreign Application Priority Data

Apr. 30, 2018 (JP) .................. 2018-087918

(51) Int. Cl.
*B41J 2/14* (2006.01)
*B01D 53/28* (2006.01)

(52) U.S. Cl.
CPC ....... *B41J 2/14233* (2013.01); *B41J 2/14201* (2013.01); *B01D 53/28* (2013.01); *B41J 2002/14241* (2013.01); *B41J 2002/14419* (2013.01)

(58) Field of Classification Search
CPC ................ B41J 2/14233; B41J 2/14201; B41J 2002/14419; B41J 2002/14241; B01D 53/28

See application file for complete search history.

(56) References Cited

U.S. PATENT DOCUMENTS

| 5,500,658 A | 3/1996 | Hattori et al. |
| 2003/0234834 A1 * | 12/2003 | Nakano ................ B41J 2/14233 347/68 |
| 2007/0146407 A1 | 6/2007 | Hiaoka |
| 2007/0291083 A1 | 12/2007 | Gyoutoku et al. |

FOREIGN PATENT DOCUMENTS

| CN | 103551058 | 2/2014 |
| JP | 01-157860 A | 6/1989 |
| JP | 02-290220 | 11/1990 |
| JP | 2007-175605 A | 7/2007 |
| JP | 2007-331318 A | 12/2007 |
| JP | 4210915 | 1/2009 |
| JP | 5424854 | 12/2013 |
| JP | 2016-000500 A | 1/2016 |

* cited by examiner

*Primary Examiner* — Geoffrey S Mruk
(74) *Attorney, Agent, or Firm* — Workman Nydegger

(57) ABSTRACT

Provided is a precision instrument including a moisture absorbent in an internal space, in which the moisture absorbent is a solid material of which a surface has a water resistance property.

9 Claims, 7 Drawing Sheets

PRECISION INSTRUMENT, MOISTURE ABSORBENT USED THEREFOR, MANUFACTURING METHOD OF MOISTURE ABSORBENT, AND MANUFACTURING METHOD OF PRECISION INSTRUMENT

The present application is based on, and claims priority from JP Application Serial Number 2018-087918, filed Apr. 30, 2018, the disclosure of which is hereby incorporated by reference herein in its entirety.

BACKGROUND

1. Technical Field

The present disclosure relates to a precision instrument, a moisture absorbent used therefor, a manufacturing method of a moisture absorbent, and a manufacturing method of a precision instrument.

2. Related Art

In a liquid ejecting head that includes a plurality of liquid ejection sections that eject a liquid by changing a pressure of a pressure chamber filled with a liquid such as ink with a driving element such as a piezoelectric element, a space in which the driving element is accommodated is sealed to protect the driving element from moisture. For example, in JP-A-2016-000500, an accommodation space of the driving element is sealed by bonding a sealing plate with an adhesive to a substrate on which the accommodation space of the driving element is formed. The adhesive that protrudes during such a bonding is accommodated in an adhesive escape space portion. However, since the adhesive escape space portion communicates with the air, there is a concern that the moisture enters the accommodation space of the driving element from the adhesive escape space portion. In JP-A-2016-000500, in order that the moisture does not enter the accommodation space of the driving element from the adhesive escape space portion, an atmosphere communication path of the adhesive escape space portion is closed to block the moisture.

However, if the atmosphere communication path that communicates with the accommodation space of the driving element is closed as in JP-A-2016-000500, the accommodation space of the driving element becomes a sealed space, so that a vibration of the pressure chamber caused by driving of the driving element is propagated to the accommodation space of the driving element, and a pressure fluctuation occurs in the accommodation space of the driving element as well. Since each pressure chamber is also affected by the pressure fluctuation of the accommodation space of the driving element, there is a concern that an ejection characteristic changes due to the pressure fluctuation of the accommodation space of the driving element. Further, the pressure fluctuation of the accommodation space of the driving element also changes depending on the number of the driving element to be driven, so that a difference is generated in the pressure fluctuation gap. Therefore, there is a concern that the ejection characteristic changes depending on the number of the driving elements to be driven.

Introducing a desiccant that absorbs moisture entering the accommodation space of the driving element necessitates a space large enough for installing a commercially available bag-shaped desiccant, which poses an obstacle to downsizing of an apparatus. Also a dust rise property of the commercially available desiccant and difficulties in removing the dust attached in a manufacturing stage by washing or the like raise a concern for ejection failure.

Problems related to measures against moisture are not limited to a liquid ejecting head or a liquid ejecting apparatus but also exist in precision instruments such as electronic devices and MEMS device, and the problems in using the desiccant also exist similarly.

For example, with improvement in performance of the precision instrument in recent years, there is an increasing demand for reducing humidity and moderating temperature changes inside an instrument as a measure against dew condensation and for extended life of high performance elements inside the instrument. Also, in a precision instrument containing an optical lens such as an endoscope, dew condensation caused by an abrupt change of temperature in operating environment poses a problem, for example.

Also, there is a concern that, dew condensation and high humidification lead to performance deterioration and shortened life of a driving actuator or a sensing actuator in an industrial robot and a consumer robot.

Further, there is a problem that, even in cooking appliances mounted with a liquid crystal panel and an organic EL panel, the moisture released in the course of cooking fogs a panel display portion.

SUMMARY

An advantage of some aspects of the disclosure is to provide a precision instrument that uses a moisture absorbent to solve a problem of dust rise, a moisture absorbent used therefor, a manufacturing method of a moisture absorbent, and a manufacturing method of a precision instrument.

A preferred aspect of the present disclosure is a precision instrument including a moisture absorbent in an internal space, in which the moisture absorbent is a solid material of which a surface has a water resistance property.

Also, another preferred aspect of the present disclosure is a moisture absorbent of which a surface is subjected to water resistance treatment.

Also, still another preferred aspect of the present disclosure is a manufacturing method of a moisture absorbent, which includes subjecting a surface of a solid moisture absorbent main body to water resistance treatment, cleaning the surface with an aqueous solvent containing no impurity, and drying the surface from the aqueous solvent.

Also, still another preferred aspect of the present disclosure is a manufacturing method of a precision instrument, which includes cleaning a moisture absorbent of which a surface is subjected to water resistance treatment with an aqueous solvent containing no impurity, drying the moisture absorbent from the aqueous solvent, and installing the dried moisture absorbent in the precision instrument.

DESCRIPTION OF EXEMPLARY EMBODIMENTS

Hereinafter, the present disclosure will be described based on an embodiment. The following embodiment relates to a liquid ejecting head and a liquid ejecting apparatus as an example of a precision instrument.

First Embodiment

Figure 1:
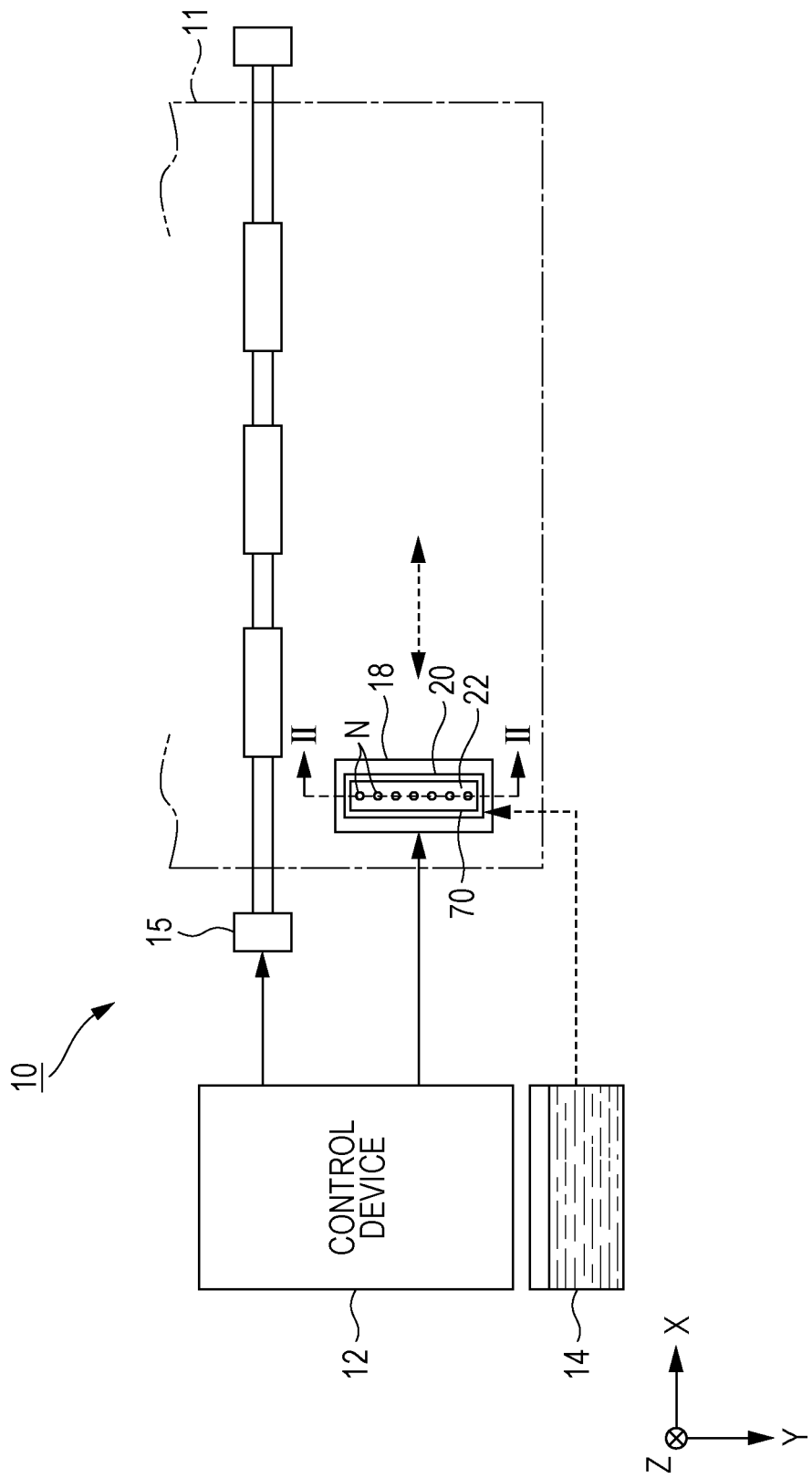
FIG. 1 is a view showing a configuration of a liquid ejecting apparatus according to a first embodiment of the present disclosure.

FIG. 1 shows a first embodiment of the present disclosure, in which a partial configuration of the liquid ejecting apparatus 10 is illustrated. The liquid ejecting apparatus 10 of the first embodiment is an ink jet type printing apparatus that ejects ink, an example of a liquid, onto a medium 11 such as printing paper and the like. The liquid ejecting apparatus 10 shown in FIG. 1 includes a control device 12, a transport mechanism 15, a carriage 18, and a liquid ejecting head 20. A liquid container 14 that stores ink is mounted on the liquid ejecting apparatus 10.

The liquid container 14 is an ink tank type cartridge made of a box-shaped container attachable to and detachable from the main body of the liquid ejecting apparatus 10. The liquid container 14 is not limited to a box-shaped container and may be an ink pack type cartridge made of a sack-shaped container. In the liquid container 14, ink is stored. The ink may be black ink or may be color ink. The ink stored in the liquid container 14 is pressure-fed to the liquid ejecting head 20.

The control device 12 comprehensively controls each element of the liquid ejecting apparatus 10. The transport mechanism 15 transports the medium 11 in the Y-direction under the control of the control device 12. The liquid ejecting head 20 ejects ink supplied from the liquid container 14 onto the medium 11 from each of a plurality of the nozzles N under the control of the control device 12.

The liquid ejecting head 20 is mounted on the carriage 18. In FIG. 1, a case where one liquid ejecting head 20 is mounted on the carriage 18 is presented as an example, but the present disclosure is not limited thereto. A plurality of the liquid ejecting heads 20 may be mounted on the carriage 18. The control device 12 causes the carriage 18 to reciprocate in the X-direction which intersects with Y-direction (orthogonal in FIG. 1). A desired image is formed on the surface of the medium 11 by ejecting ink from the liquid ejecting head 20 onto the medium 11 in concurrence with a repetition of the transport of the medium 11 and the reciprocation of the carriage 18. A plurality of the liquid ejecting heads 20 may be mounted on the carriage 18.

In the liquid ejecting head 20, a liquid ejection section 70 is mounted. In the liquid ejection section 70, a nozzle row is disposed. The nozzle row is a collection of a plurality of nozzles N arranged in a straight line in the Y-direction. The ink supplied from the liquid container 14 is ejected from each nozzle N. The nozzle N of each nozzle row is formed on an ejection surface 22 (the surface facing the medium 11) of the liquid ejecting head 20. Further, the number and arrangement of the liquid ejection section 70 and the nozzle row are not limited to the example. For example, it is also possible to arrange a plurality of nozzle rows in a zigzag or staggered pattern on the ejection surface 22 of the liquid ejecting head 20. The direction perpendicular to the X-Y plane (a plane parallel to the surface of medium 11) is denoted as the Z-direction.

Figure 2:
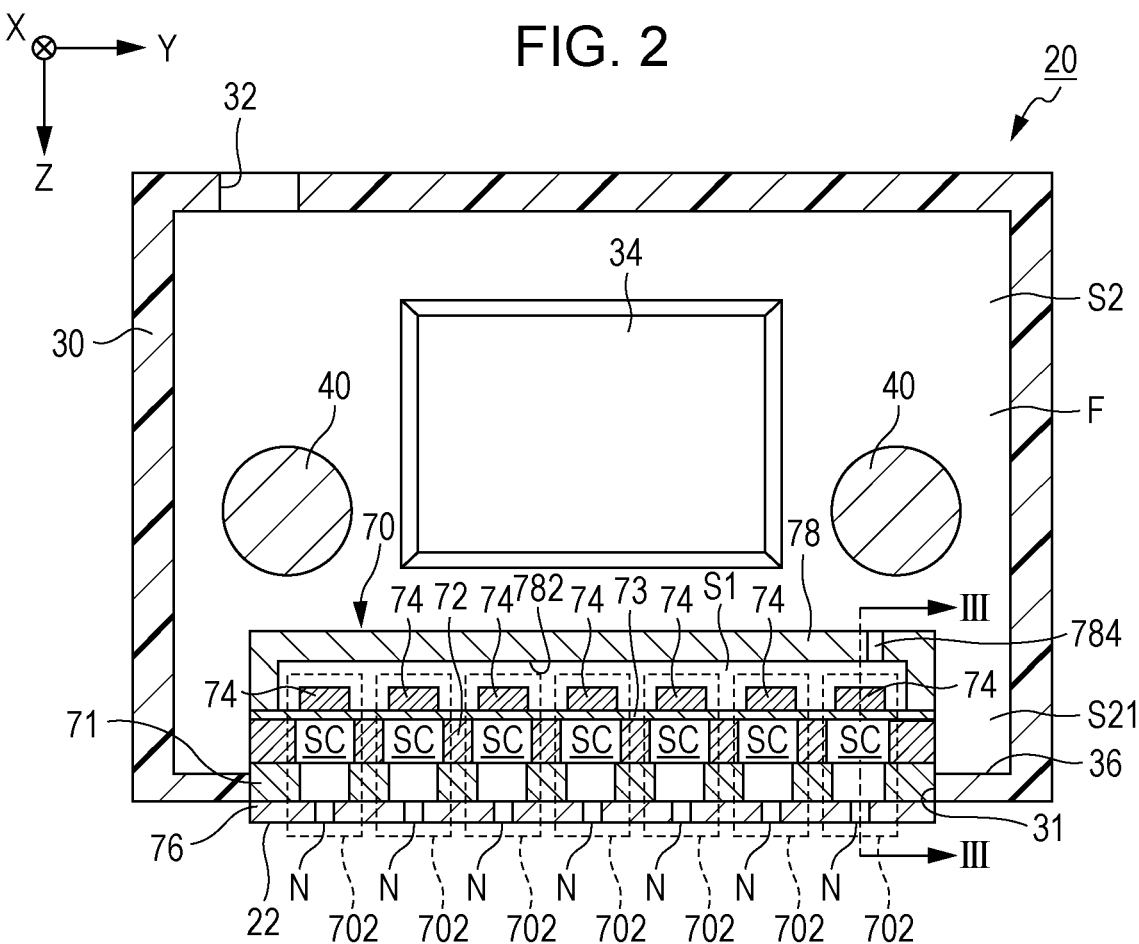
FIG. 2 is a sectional view taken along line II-II of a liquid ejecting head shown in FIG. 1.

FIG. 2 shows a sectional view of the liquid ejecting head 20 shown in FIG. 1 taken along the line II-II. As shown in FIG. 2, the liquid ejecting head 20 includes the liquid ejection section 70 and the case member 30. The liquid ejection section 70 is accommodated in the case member 30. Specifically, an opening section 31 is formed on the positive side (downward in FIG. 2) of the Z-direction of the case member 30. The liquid ejection section 70 is fixed to the case member 30 so that the ejection surface 22 is exposed from the opening section 31. The liquid ejection section 70 includes the ejection section 702 corresponding to each nozzle N.

Figure 3:
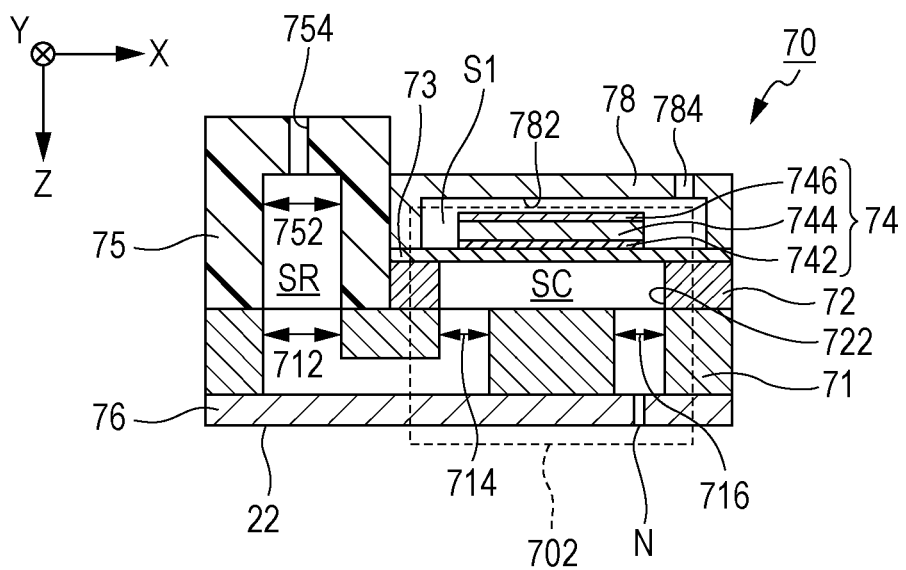
FIG. 3 is a sectional view taken along line III-III of a liquid ejection section shown in FIG. 2.

FIG. 3 shows a sectional view of the liquid ejection section 70 with a focus on one random ejection section 702. The liquid ejection section 70 shown in FIG. 3 is a structure in which the pressure chamber substrate 72, the diaphragm 73, the piezoelectric element 74, and the support body 75 are disposed on one side of the flow path substrate 71 while the nozzle plate 76 is disposed on the other side thereof. The flow path substrate 71, the pressure chamber substrate 72, and the nozzle plate 76 are formed of a flat plate material of silicon for example, and the support body 75 is formed of a resin material by injection molding for example. The pressure chamber substrate 72 and diaphragm 73 may be provided integrally as in a case where a part of a member constituting the pressure chamber substrate 72 is thinned to function as the diaphragm 73. A plurality of the nozzles N are formed on the nozzle plate 76. In the configuration of FIG. 3, the surface of the nozzle plate 76 facing the medium 11 constitutes the ejection surface 22 of the liquid ejecting head 20.

On the flow path substrate 71, the opening section 712, the branch flow path 714, and the communication flow path 716 are formed. The branch flow path 714 and the communication flow path 716 are through holes formed for each nozzle N, and the opening section 712 is a continuous opening for a plurality of the nozzles N. The space in which the accommodation section 752 (recess section) formed on the support body 75 and the opening section 712 of the flow path substrate 71 communicate with each other functions as the common liquid chamber SR (reservoir) that stores the ink supplied from the liquid container 14 through the introduction flow path 754 of the support body 75.

On the pressure chamber substrate 72, the opening section 722 is formed for each nozzle N. The diaphragm 73 is an elastically deformable plate material disposed on the surface of the pressure chamber substrate 72, which is an opposite side to the flow path substrate 71. Space pinched between the diaphragm 73 and the flow path substrate 71 inside each opening section 722 of the pressure chamber substrate 72 functions as the pressure chamber SC (cavity) which is filled with ink supplied from the common liquid chamber SR through the branch flow path 714. Each pressure chamber SC communicates with the nozzle N through the communication flow path 716 of the flow path substrate 71.

On the surface of the diaphragm 73, opposite to the pressure chamber substrate 72, the piezoelectric element 74 is formed for each nozzle N. Each piezoelectric element 74 is a driving element in which the piezoelectric body 744 is interposed between the first electrode 742 and the second electrode 746. A driving signal is supplied to either one of the first electrode 742 and the second electrode 746, and a predetermined reference potential is supplied to the other. When the diaphragm 73 vibrates due to deformation of the piezoelectric element 74 by the supply of the driving signal, pressure in the pressure chamber SC fluctuates and the ink in the pressure chamber SC is ejected from the nozzle N. Specifically, the ink is ejected from the nozzle N in the amount that corresponds to the amplitude of the driving signal. One ejection section 702 shown in FIG. 3 is a portion that includes the piezoelectric element 74, the diaphragm 73, the pressure chamber SC, and the nozzle N. The configuration of the piezoelectric element 74 is not limited to the above description.

As shown in FIGS. 2 and 3, to protect the piezoelectric element 74 and the diaphragm 73 from moisture, each of the piezoelectric element 74 and the diaphragm 73 is accommodated in the first space S1 (accommodation space), and the first space S1 is sealed with the sealing body 78. The sealing body 78 according to the embodiment is a plate-shaped member having a recess portion 782 formed on the positive side in the Z-direction and is bonded to the diaphragm 73 with an adhesive or the like. The first space S1 is a space surrounded by the recess portion 782 of the sealing body 78 and the diaphragm 73. The internal space of the case member 30 functions as the second space S2 surrounding the sealing body 78.

Meanwhile, if the first space S1 that accommodates the piezoelectric element 74 and the diaphragm 73 communicates with the air, the moisture enters the first space S1 easily. When the moisture enters the first space S1 and the piezoelectric element 74 is exposed to the humid environment for a long period of time, there is also a concern that the first electrode 742 and the second electrode 746 of the piezoelectric element 74 corrode, or that the strength declines and cracking occurs due to a hydrolysis. Further, there is a concern that, if the diaphragm 73 is exposed to the highly humid environment for a long period of time, the strength of the diaphragm 73 also deteriorates and cracking occurs due to a hydrolysis. However, if the first space S1 is made a sealed space that does not communicate with atmosphere to prevent the moisture from entering the first space S1, a vibration of pressure chamber SC caused by driving of the piezoelectric element 74 is propagated to the first space S1 and a pressure fluctuation also occurs in the first space S1. Since each pressure chamber SC is also affected by the pressure fluctuation of the first space S1, there is a concern that the ejection characteristic changes due to the pressure fluctuation of the first space S1 caused by such a structural crosstalk. The pressure fluctuation of the first space S1 also changes depending on the number of the piezoelectric element 74 to be driven, causing a large difference in the pressure fluctuation gap, so that there is a concern that the ejection characteristic changes depending on the number of the piezoelectric element 74 to be driven. In particular, while the ink jet head needs to be made multi-headed through increased densification and downsizing of a nozzle to meet the demand for high throughput of the ink jet printing apparatus, the volume of a sealed space tends to become small and the number of nozzles held by the sealed space tends to be large, so that a shortcoming of the sealed space become conspicuous.

Therefore, in the embodiment, as shown in FIG. 2, while the atmosphere vent 32 through which the second space S2 communicates with atmosphere is formed in the case member 30, the communication hole 784 through which the first space S1 communicates with the second space S2 is formed in the sealing body 78, and the moisture absorbent 40 is disposed in the second space S2.

In the configuration of FIG. 2, a case where the two moisture absorbents 40 are disposed apart from each other in the Y-direction on a positive side surface in the X-direction of the inner circumferential surface F (inner wall surface in the vertical direction in FIG. 2) of the case member 30 is presented as an example. However, the number of the moisture absorbent 40 may be one, or three or more. Further, in the configuration of FIG. 2, since the circuit substrate 34 that drives the piezoelectric element 74 on a positive side surface in the X-direction of the inner circumferential surface F of the case member 30 is disposed, the moisture absorbent 40 is disposed on each side of the Y-direction across the circuit substrate 34 one by one. According to such a configuration, the piezoelectric element 74 and the diaphragm 73 can be protected from the moisture while the pressure fluctuation of the first space S1 that accommodates the piezoelectric element 74 is suppressed.

Figure 4:
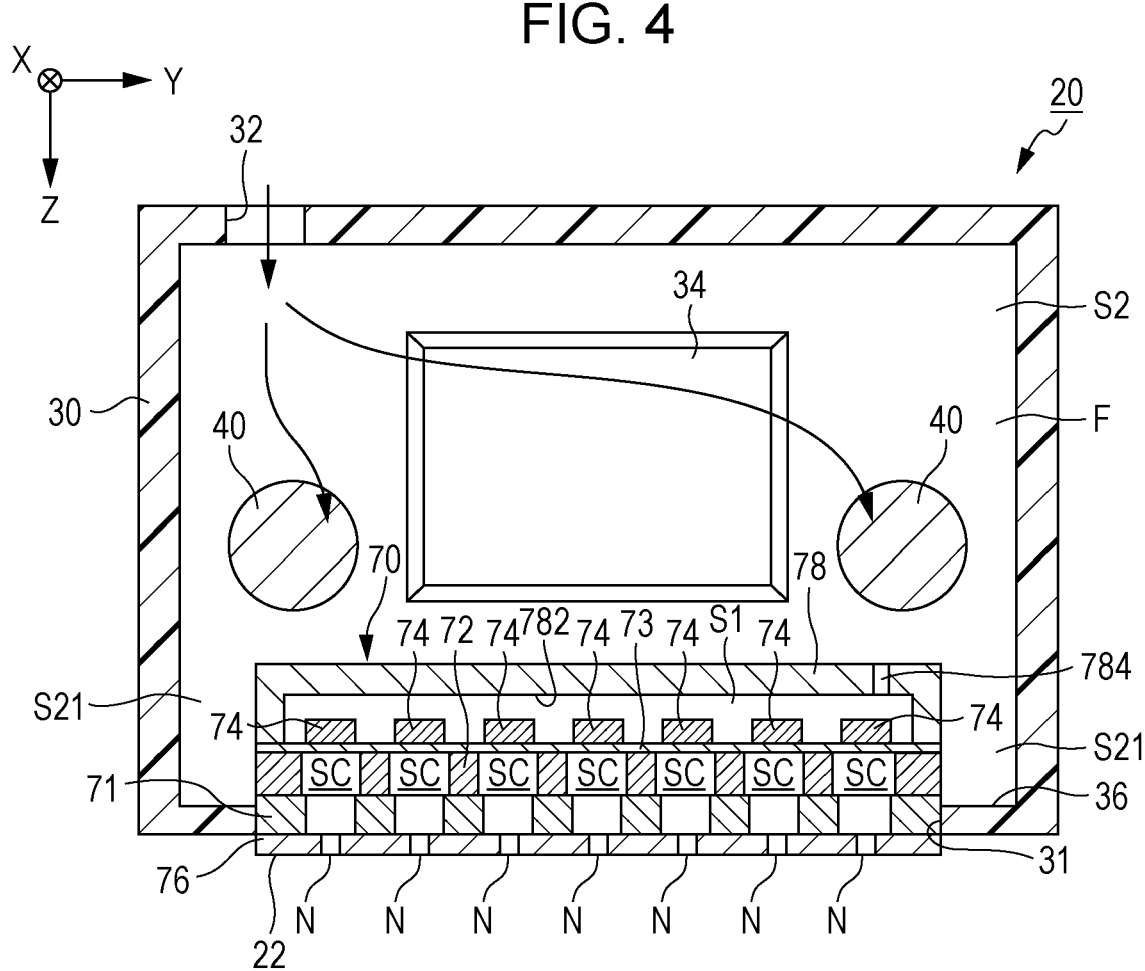
FIG. 4 is a descriptive view showing an operation of the liquid ejecting head of the embodiment.
Figure 5:
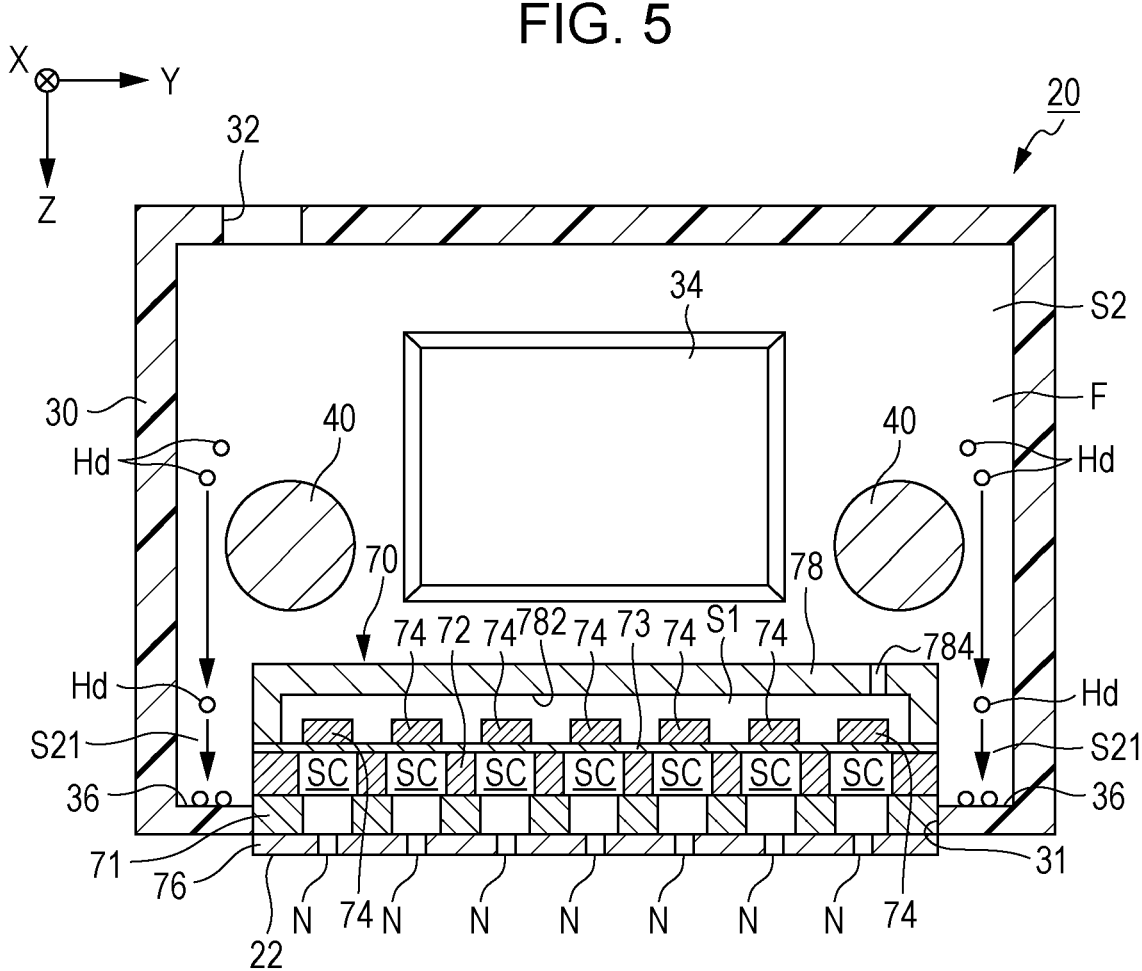
FIG. 5 is a descriptive view showing an operation of the liquid ejecting head of the embodiment.

Hereinafter, an operational effect according to the embodiment will be described with reference to the figures. FIGS. 4 and 5 show an embodiment of the liquid ejecting head 20 showing an operation thereof. FIG. 4 shows a flow of the moisture that entered the second space S2 from the atmosphere vent 32 with an arrow. FIG. 5 shows a case where the water component of the moisture that entered the second space S2 from the atmosphere vent 32 condenses to adhere to the inner circumferential surface F of the case member 30.

In the liquid ejecting head 20 according to the embodiment, since the first space S1 that accommodates the piezoelectric element 74 communicates through the communication hole 784 with the second space S2 that communicates with the air, the first space S1 can be prevented from becoming a sealed space. Therefore, since a fluctuation in pressure of the first space S1 that accommodates the piezoelectric element 74 caused by the vibration of the pressure chamber SC can be suppressed, an ejection failure caused by the structural crosstalk can be reduced. Further, since the moisture absorbent 40 is disposed in the second space S2, even if the moisture enters the second space S2 from the atmosphere vent 32 as shown in FIG. 4, the moisture is absorbed by the moisture absorbent 40 in the second space S2. Therefore, since the moisture entering the first space S1 through the communication hole 784 can be reduced, the piezoelectric element 74 and the diaphragm 73 can be protected from moisture. With this configuration, the piezoelectric element 74 and the diaphragm 73 can be protected from the moisture while the pressure fluctuation of the first space S1 that accommodates piezoelectric element 74 is suppressed.

Further, as shown in FIG. 2, according to the embodiment, since the opening area (sectional area orthogonal to Z-direction) of the communication hole 784 is smaller than the opening area (sectional area orthogonal to Z-direction) of the atmosphere vent 32, it is difficult for the moisture that entered the second space S2 from the atmosphere vent 32 to enter the first space S1 from the communication hole 784. The opening area of the communication hole 784 may be of any size such that the pressure vibration of the first space S1 can be suppressed at least to the extent that the first space S1 is not affected by the crosstalk described above. Further, a case where the communication hole 784 and the atmosphere vent 32 according to the embodiment are composed of the straight type openings is presented as an example, but the present disclosure is not limited thereto. The communication hole 784 and the atmosphere vent 32 may be openings that include an expanding diameter section or a shrinking diameter section in a taper-shaped form. In this case, by setting the minimum opening area of communication hole 784 smaller than the minimum opening area of the atmosphere vent 32, it is possible to make it difficult for the moisture that entered the second space S2 from the atmosphere vent 32 to enter the first space S1 from communication hole 784.

The moisture absorbent 40 according to the present embodiment is a solid desiccant, and the desiccant powder is a solid material of which the surface has a water resistance property. In the present embodiment, the moisture absorbent 40 is fixed to the internal circumferential surface F of the case member 30 by adhesion with an adhesive.

Figure 7:
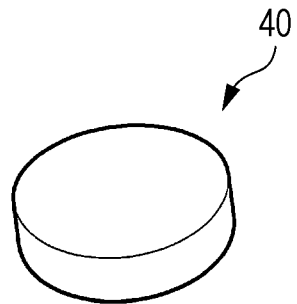
FIG. 7 is a perspective view of a moisture absorbent of the first embodiment.

Here, the moisture absorbent 40 is made of a solid material which is downsized and easy to install with a low dust rise property. There is no particular limit to the shape of the solid material, and examples are a tablet type, various plate shapes, a cylindrical shape, a cube shape, a rectangular shape, a parallelepiped shape, and the like. A tablet type, especially a cylindrical plate type, is preferable from the viewpoint of easiness of molding and shape retention. Also, considering the adhesiveness by an adhesive, even a tablet type is preferably cylindrical plate-shaped, having a flat, not curved, end surface. In the present embodiment, as shown in FIG. 7, the moisture absorbent 40 is formed into a tablet type or a cylindrical plate-shaped type.

Figure 8:
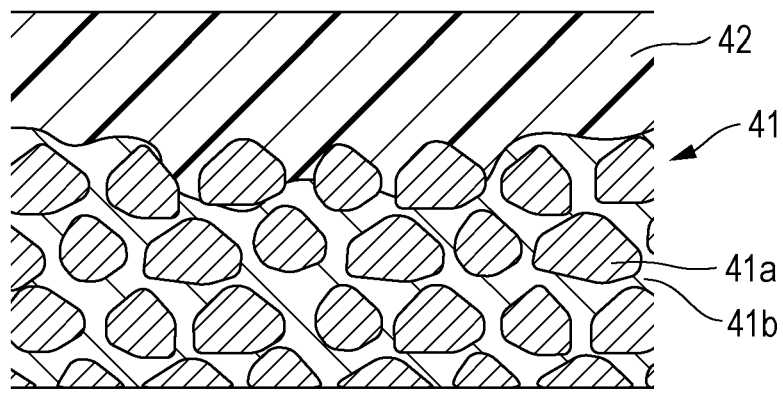
FIG. 8 is a partial sectional view of the moisture absorbent of the first embodiment.

Also, as shown in FIG. 8 which schematically shows a partial sectional structure of the moisture absorbent 40, the moisture absorbent 40 is made of a solid moisture absorbent main body 41 and a coat layer 42, the solid moisture absorbent main body 41 being obtained by kneading and compression molding of the desiccant powder 41a and the binder 41b. In the figure, the solid moisture absorbent main body 41 and the coat layer 42 are schematically shown and the state in which the solid moisture absorbent main body 41 is composed of the desiccant powder 41a and the binder 41b is exaggerated, but this is an example of a schematic showing and the state is not limited thereto. The desiccant powder 41a is composed of at least one selected from silica gels such as A-type silica gel and B-type silica gel, allophane type clay which is a mixture of silica gel and alumina, zeolite, activated carbon or the like. There is no particular limit to the binder 41b as long as the binder 41b binds while keeping the moisture absorption property of the desiccant powder 41a, but an inorganic binder such as mineral clay and diatomaceous earth, a resin binder such as a polyolefin resin, polyethylene resin, or the like can be considered.

The coat layer 42 is formed of resin and has a water resistance property and a water vapor permeability property. Examples of such a resin are an acrylic resin, an acrylic silicone resin, an epoxy resin, an alkyd resin, a complete saponification type polyvinyl alcohol resin and the like. Here the acrylic resin is highly water resistant but is susceptible to water vapor permeability and easy to disperse in an aqueous solvent, so that it can be treated with a low volatile organic compound (VOC) and the coating method is preferably easy. Also, since the coat layer 42 is highly hard, the epoxy resin is preferable in that the moisture absorbent 40 is easy to handle and the surface durability thereof is high. For example, a water-soluble resin such as cellulose can be considered as a resin susceptible to water vapor permeability but not water resistant and these resins are unsuitable as a material of the coat layer 42.

Figure 9:
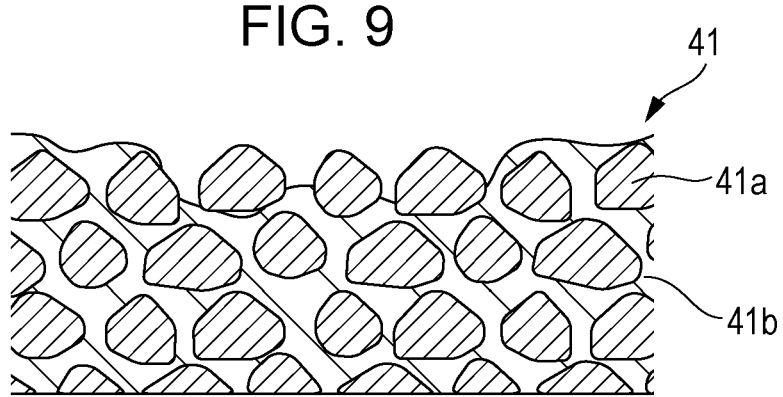
FIG. 9 is a partial sectional view of the moisture absorbent of the first embodiment before a coat layer is provided.

FIG. 9 is a schematic view of the solid moisture absorbent main body 41 before the coat layer 42 is formed. There is a concern that, when the binder 41b composed of mineral clay or the like degenerates, the solid moisture absorbent main body 41 loses its binding force and crumbles. Also, since a dust particle adheres to the surface of the solid moisture absorbent main body 41 after production, it is necessary to perform cleaning or the like to carry the solid moisture absorbent into a cleanroom or the like where a precision instrument is manufactured. However, the solid moisture absorbent main body 41 is not water resistant to survive cleaning. For example, if a solid moisture absorbent is put in pure water and ultrasonic cleaning is carried out, a trouble is that only the surface of the solid moisture absorbent absorbs moisture and expands to generate cracks. Also, another example of trouble is that, when a solid moisture absorbent, to which a highly moisture permeable but not water resistant coating is performed, is subjected to running water, the coating of the surface is eluted.

Since the moisture absorbent 40 according to the present embodiment is covered with the coat layer 42, a stable surface is maintained without degeneration even if moisture is absorbed. That is, the existence of a water resistant coat layer on the surface alleviates a concern that a cracking is generated by abrupt moisture absorption and expansion by the surface alone or that the coating of the surface is eluted. Then, since the surface is sufficiently stable, scattering of the desiccant powder 41a and the binder 41b due to ageing and degeneration can be suppressed. Further, since the surface has a water resistance property with the coat layer 42, the surface does not degenerate even when ultrasonic cleaning in pure water or cleaning by running water is performed, so that dust and foreign matter adhering to the surface can be removed effectively.

As described above, a moisture absorption property can be improved by the surface being composed of water resistant solid material, so that the moisture absorbent 40 can be easily held in a small space in a precision instrument.

Also, the surface needs to be water resistant so that it can be cleaned. Normally, since a precision instrument is assembled in a cleanroom or an equivalent clean place with no dust therein, it is necessary to use the moisture absorbent 40 itself by ultrasonic cleaning or the like.

Here, a water resistance property means that various physical properties (surface hardness, tackiness, surface roughness) of the surface do not degenerate even when it is immersed in water at 40° C. for about ten minutes. Also, in this way, it is possible to clean the surface of the moisture absorbent 40. In the present embodiment, for example, the moisture absorbent 40 is dried at 135° C. for four hours after being cleaned with pure running water after ultrasonic cleaning in pure water and is put into use. Since the moisture absorbent 40 according to the present embodiment has the coat layer 42, moisture resistance is excellent. In this way, the process of providing the coat layer 42 is a process of imparting a water resistance property, but water resistance treatment other than coating may be applied as long as a water resistance property can be imparted.

Water resistance treatment other than coating includes forming only a portion near the surface with resin powder or wrapping the surface with a moisture permeable film in manufacturing a moisture absorbent by compression molding.

Also, it is preferable that the moisture absorbent 40 has a low dust rise property. Here, "low dust rise" is a state in which a dust particle hardly peels off when the adhesive tape of Hitarex A-2450 (made by Hitachi Chemical Co., Ltd) is stuck to and then peeled off from a surface of the moisture absorbent 40. For example, if one to three dust particles are observed per square centimeter, dust rise is low, but it is preferable that dust is not observed at all. Also, it is preferable to retain the low dust rise property even after ageing and degeneration following moisture absorption. Since the moisture absorbent 40 according to the present embodiment has coat layer 42, dust does not rise after cleaning.

Here, a dust particle is approximately several micrometers to 50 μm in size. There is a concern that such dust may clog a nozzle.

Also, since the moisture absorbent 40 has a coat layer 42 made of a resin material, it is possible to easily select the adhesive and bond with the resin member at the time of bonding. Also, even after the solid moisture absorbent main body 41 absorbs moisture, ages and degenerates, the ageing and degeneration of the coat layer 42 are minimal such that there is an advantage that the bonding does not become defective.

The coat layer 42 may be provided on the adhesion surface only from the viewpoint of such adhesiveness. However, from the viewpoint of water resistance and low dust rise, the coat layer 42 may be provided on the entire surface of the solid moisture absorbent main body 41.

Further, the coat layer 42 needs to have water vapor permeability, but it is preferable that the moisture absorption property which is the mass increase amount when the moisture absorbent 40 is left in an environment of 90% RH at 40° C. is 2 to 200 mg/h. If the moisture absorption property is less, the hygroscopic capacity cannot be sufficiently utilized. If the moisture absorption property is greater, moisture absorption in the manufacturing process is excessive so that there is a possibility saturation state is reached early, which is not preferable.

In particular, the moisture absorbent contained in a small precision instrument such as an ink jet head, an endoscope, and the like does not require large moisture absorption capacity because the volume that needs drying is small. Therefore, the proper moisture absorption property can be obtained by coating the surface with water resistant material of which thickness is controlled. Also, by obtaining the proper moisture absorption property, it is possible to suppress the moisture absorption amount lost by the moisture absorbent being exposed to the outside atmosphere before installation in a precision instrument in the manufacturing process of the precision instrument. For example, in an ink jet head made by an inventor, the moisture absorption property of the installed moisture absorbent may be 2 to 10 mg/h, and the moisture absorbent of which the moisture absorption property is suppressed is suitable.

Also, it is preferable that a surface arithmetic roughness Ra of the surface of the coat layer 42 is 1 μm to 15 μm. With such a surface, cleaning becomes easy and adhesion of a dust particle on the surface after cleaning is avoided. Also, if the surface roughness is greater, dust tends to rise more.

For example, the surface arithmetic roughness Ra of the surface before the coat layer 42 as shown in FIG. 9 is provided is approximately 20 μm to 50 μm in general.

The thickness of the coat layer 42 is approximately 2 μm to 100 μm. For example, when the coat layer 42 is formed with such thickness with an acrylic resin, the moisture absorption property as described above can be obtained.

Even when the coat layer 42 is not provided, there is a possibility that the water resistance property and the low dust rise property can be satisfied when the binder 41*b* is a resin binder. Also, further, it is possible to further improve the low dust rise property by using a material of which the dust rise property is low even when the desiccant powder 41*a* ages and degenerates and forming body of which the surface roughness is small. When the resin binder is used to mold a flat surface, the surface arithmetic roughness Ra of the surface can be set to approximately 5 to 15 μm.

An example of a manufacturing method of such a moisture absorbent 40 is as follows.

First, a solvent is added to the desiccant powder 41*a* and the binder 41*b* as needed and the mixture is kneaded, and the kneaded materials is compressed and molded to form the solid moisture absorbent main body 41 by drying and sintering as needed.

Next, the coat layer 42 is provided on the solid moisture absorbent main body 41. As for the formation method of the coat layer 42, a dip method, a brush coating method, a spray method, or the like can be used.

After that, the moisture absorbent 40 goes through an ultrasonic cleaning with pure water and drying before being installed in an instrument. For example, drying is performed at 60° C. for 24 hours or at 135° C. for four hours. In this way, the moisture absorbent 40 becomes water resistant on the surface and free from adhesion of a dust particle and dust rise as well in accordance with the present disclosure.

Manufacturing the moisture absorbent 40 in accordance with the present disclosure requires (1) compression molding step, (2) a water resistance treatment step, a coating step, in particular, (3) a cleaning step with an aqueous solvent containing no impurity, and (4) a volatilization (drying) step from the aqueous solvent. Here, the aqueous solvent containing no impurity is an aqueous solvent in which no dust is precipitated after evaporation, and the aqueous solvent is pure water, pure water with water-soluble organ solvent such as alcohols, glycols, or the like added, or a solvent with a water-soluble organic solvent as a main component.

In this way, it is possible to manufacture the moisture absorbent 40, water resistant and raising low dust, that can be easily mounted in a small space in a precision instrument.

According to the embodiment, each of the two moisture absorbents 40 uses the A-type silica gel that can maintain a stable absorption of the moisture even at a low temperature as the desiccant powder 41*a*. However, the moisture absorbent 40 may be anything that can absorb the moisture that entered the second space S2. According to the embodiment, the desiccant powder 41*a* composed of the A-type silica gel can absorb the moisture effectively even in an environment of low temperature. The desiccant powder 41*a* may be composed of the B-type silica gel or other the moisture absorbing materials.

It is desirable to use a physical absorption type desiccant such as silica gel, zeolite, allophane and the like rather than a chemical reaction type desiccant such as calcium chloride, calcium oxide, quicklime and the like as the desiccant powder 41*a*. Being chemically stable and not subject to a chemical reaction caused by moisture absorption, the physical absorption type desiccant powder 41*a* can prevent the desiccant powder 41*a* from degeneration at the time of surface coating and can prevent the desiccant powder 41*a* from degeneration and deformation caused by moisture absorption over a long-time use.

Further, out of the two moisture absorbents 40, one desiccant powder 41*a* may be composed of the A-type silica gel and the other desiccant powder 41*a* may be composed of a gas absorbent. The gas absorbent has higher absorption capacity than A-type silica gel and the like. Therefore, it is possible to absorb sulfur-based gas, chlorine-based gas and the like as well as the moisture that entered the second space S2 from the atmosphere vent 32. There is a concern that sulfur-based gas, chlorine-based gas, and the like corrode the electrical connection section, the first electrode 742 and the second electrode 746 of the piezoelectric element 74, and the like in the case member 30. According to the embodiment, since the sulfur-based gas and the chlorine-based gas are absorbed in the second space S2, the entry thereof into the first space S1 from the communication hole 784 can be suppressed. Therefore, the piezoelectric element 74 can be protected from the sulfur-based gas and the chlorine-based gas that entered from the atmosphere vent 32.

Further, as shown in FIG. 2, according to the embodiment, since the moisture absorbent 40 is in a position closer to the communication hole 784 than the atmosphere vent 32, compared with a case where the moisture absorbent 40 is in a position close to the atmosphere vent 32, it is possible to suppress suction of the moisture outside the second space S2 from the atmosphere vent 32 and absorption of the moisture. Therefore, the time during which hygroscopic capacity of the moisture absorbent 40 can be maintained can be extended. Further, since the moisture absorbent 40 is in a position close to the communication hole 784, compared with a case where the moisture absorbent 40 is in a position away from the communication hole 784, it is possible to make it difficult for the moisture to enter from communication hole 784.

Further, according to the embodiment, the atmosphere vent 32 is in a position higher than the communication hole 784 in the vertical direction (Z-direction), and the moisture absorbent 40 is disposed between the atmosphere vent 32 and the communication hole 784 in the vertical direction. With this configuration, as shown in FIG. 5, the water component of the moisture that entered the second space S2 from the atmosphere vent 32 condenses between the atmosphere vent 32 and the communication hole 784 due to a temperature drop, and the dew condensation droplet Hd adheres to the inner circumferential surface F of the case member 30 in some cases. Then, there is a concern that the dew condensation droplet Hd evaporates to raise the moisture high when the temperature rises again thereafter. However, when the dew condensation droplet Hd evaporates, the water component rises up in the vertical direction (wavy arrow line of FIG. 6), so that the moisture can be absorbed efficiently by the moisture absorbent 40 disposed between the atmosphere vent 32 and the communication hole 784. Therefore, even if the dew condensation droplet Hd evaporates on the inner circumferential surface F of the case member 30, entry of the moisture into communication hole 784 can be suppressed so that the reliability of the apparatus even in the highly humid environment can be maintained.

Further, as shown in FIG. 5, according to the embodiment, the second space S2 includes the recess portion S21 that includes the bottom surface 36 positioned lower than the communication hole 784 in the vertical direction. The recess portion S21 of FIG. 5, disposed around the liquid ejection section 70, is a ring-shaped groove surrounded by the outer circumferential surface (the surface in Z-direction) of liquid ejection section 70, a part of the inner circumferential surface F of the case member 30 that faces the outer circumference surface of the liquid ejection section 70, and the bottom surface 36. With this configuration, as shown in FIG. 5, the second space S2 can trap the dew condensation droplet Hd in the recess portion S21 even if the dew condensation droplet Hd adhering to the inner circumferential surface F of the case member 30 moves downward along the inner circumferential surface of the case member 30. Further, since the recess portion S21 has the bottom surface 36 positioned lower than the communication hole 784 in the vertical direction, the dew condensation droplet Hd can be stored in the recess portion S21 positioned lower than the communication hole 784, and thus, entry of the dew condensation droplet Hd into the communication hole 784 can be suppressed. Further, the shape of the recess portion S21 may not be annular. Further, the position of the recess portion S21 is not limited to the circumference of the liquid ejection section 70.

According to the embodiment, the material of the case member 30 has higher thermal conductivity than the sealing body 78. With this configuration, when temperature falls, the water component of the moisture that entered the second space S2 can be condensed actively on the inner circumferential surface F of the case member 30 in the second space S2. Therefore, since the moisture of the first space S1 can be lowered, the dew condensation can be made difficult in the first space S1. Further, when temperature rises, the dew condensation droplet Hd condensed on the inner circumferential surface F of the case member 30 evaporates again in the second space S2, so that the moisture is absorbed by the moisture absorbent 40 easily. Further, the case member 30 may be made of a resin material, so that a coat layer that suppresses permeation of the water component may be formed on the inner circumferential surface F. As for the coat layer, a material that easily condenses moisture, for example, a moisture-proof coating material like Fluorosurf (registered trademark of Fluoro Technology Co., Ltd.) and the like, may be considered. With this configuration, the case member 30 that can actively condense the moisture on the inner circumferential surface F of the case member 30 can be manufactured at low cost.

Further, as shown in FIG. 2, according to the embodiment, the circuit substrate 34 that can be a heat source is disposed in the second space S2, so that the temperature of the second space S2 rises more easily than the temperature of the first space S1, and thus, the permissible volume of the saturated water component in the second space S2 increases, and the evaporation volume of the water component increases easily. According to the embodiment, since the moisture absorbent 40 is present in the second space S2 where the circuit substrate 34 of which the ambient temperature rises easily is disposed, the moisture of the second space S2, where the evaporation volume of the water component increases easily, can be absorbed efficiently.

Further, according to the embodiment, the volume of the first space S1 is smaller than the volume of the second space S2. For example, the volume of the first space S1 is 1 to 10 $mm^3$, while the volume of the second space S2 is 10,000 to 400,000 $mm^3$. In this way, the smaller the volume of the first space S1 with respect to the volume of the second space S2, the smaller the dew condensation amount in the first space S1 can be made considerably than the dew condensation amount in the second space S2 even if dew condensation occurs. Therefore, the characteristic deterioration of the piezoelectric element 74 caused by the dew condensation can be reduced. Conversely, since the volume of the second space S2 is larger than the volume of the first space S1, the moisture absorbent 40 disposed in the second space S2 is increased easily, and thus, the hygroscopic effect by the moisture absorbent 40 can be enhanced.

Figure 6:
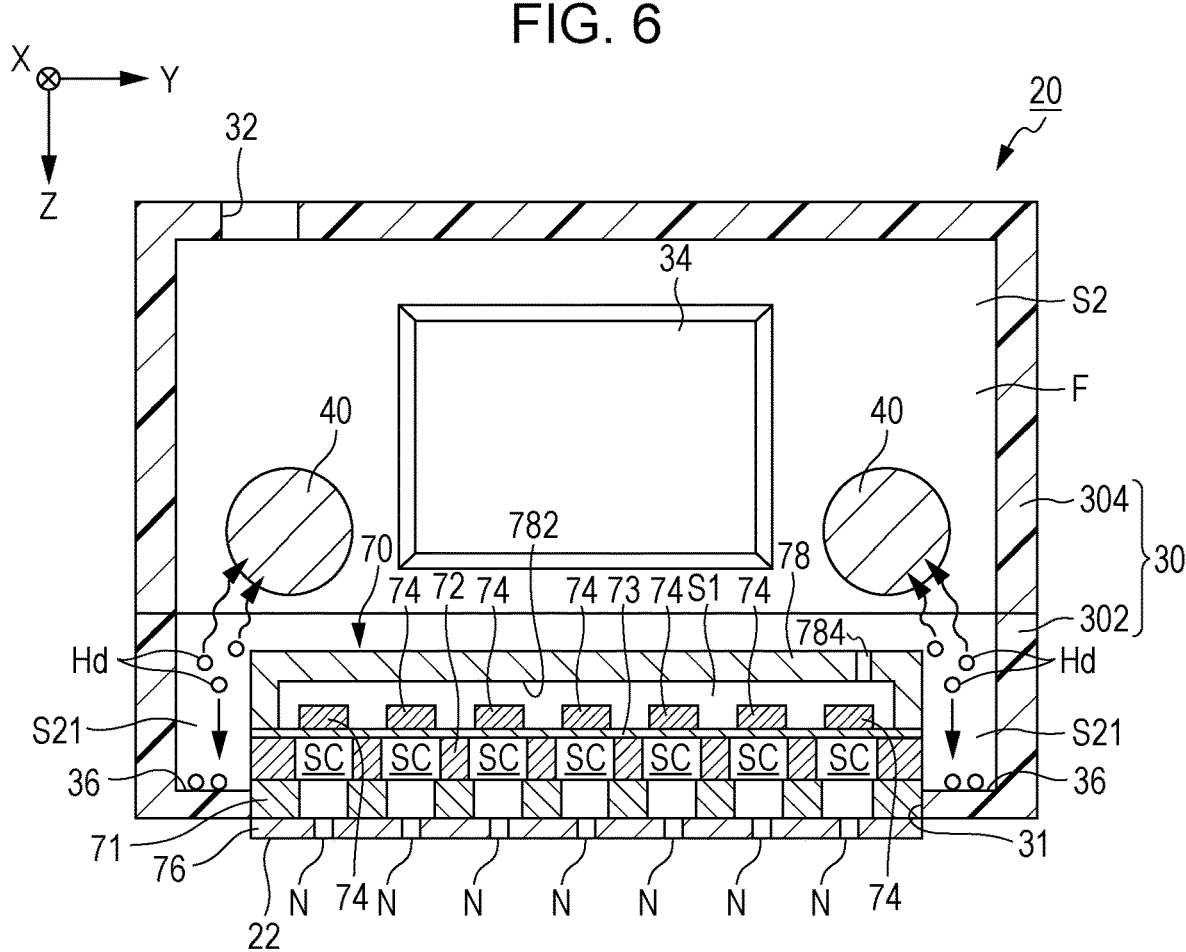
FIG. 6 is a sectional view showing a configuration of a liquid ejecting head according to a modification example of the first embodiment.

FIG. 6 shows a sectional view of the configuration of the liquid ejecting head 20 according to a modification example of the first embodiment and corresponds to FIG. 2. The case member 30 of FIG. 6 includes the lower case member 302 on the lower side in the vertical direction and the upper case member 304 on an upper side higher than the lower case member 302 in the vertical direction. The lower case member 302 and the upper case member 304 are bonded together with an adhesive or the like. The moisture absorbent 40 in FIG. 6 is disposed on the upper case member 304, and the lower case member 302 has a higher thermal conductivity than the upper case member 304.

According to the configuration of FIG. 6, since the lower case member 302 that constitutes the case member 30 has a higher thermal conductivity than the upper case member 304, when temperature falls, the water component of the moisture that entered the second space S2 can condense more easily in the lower case member 302 than the upper case member 304. Therefore, when temperature rises, the dew condensation droplet Hd adhering to the lower case member 302 evaporates again to rise up and is absorbed easily by the moisture absorbent 40 disposed in the upper case member 304 (wavy arrow line in FIG. 6). Further, the dew condensation droplet Hd that moves downward along the inner circumferential surface F of the lower case member 302 is trapped easily in the recess portion S21 (straight arrow line in FIG. 6). Further, in FIG. 6, a case where the lower case member 302 and the upper case member 304 are bonded together is presented as an example, but the present disclosure is not limited thereto. For example, another member (for example, a sealing member for sealing the second space S2) may be interposed between the lower case member 302 and the upper case member 304.

Second Embodiment

A second embodiment of the present disclosure will be described. For the element that has the same operation and function as in the first embodiment in each form presented below, reference numerals used in the description of the first embodiment will be used and the detailed description thereof will be omitted as deemed appropriate. In the second embodiment, the liquid ejecting head 20 that includes a plurality of the liquid ejection sections 70 will be presented as an example.

Figure 10:
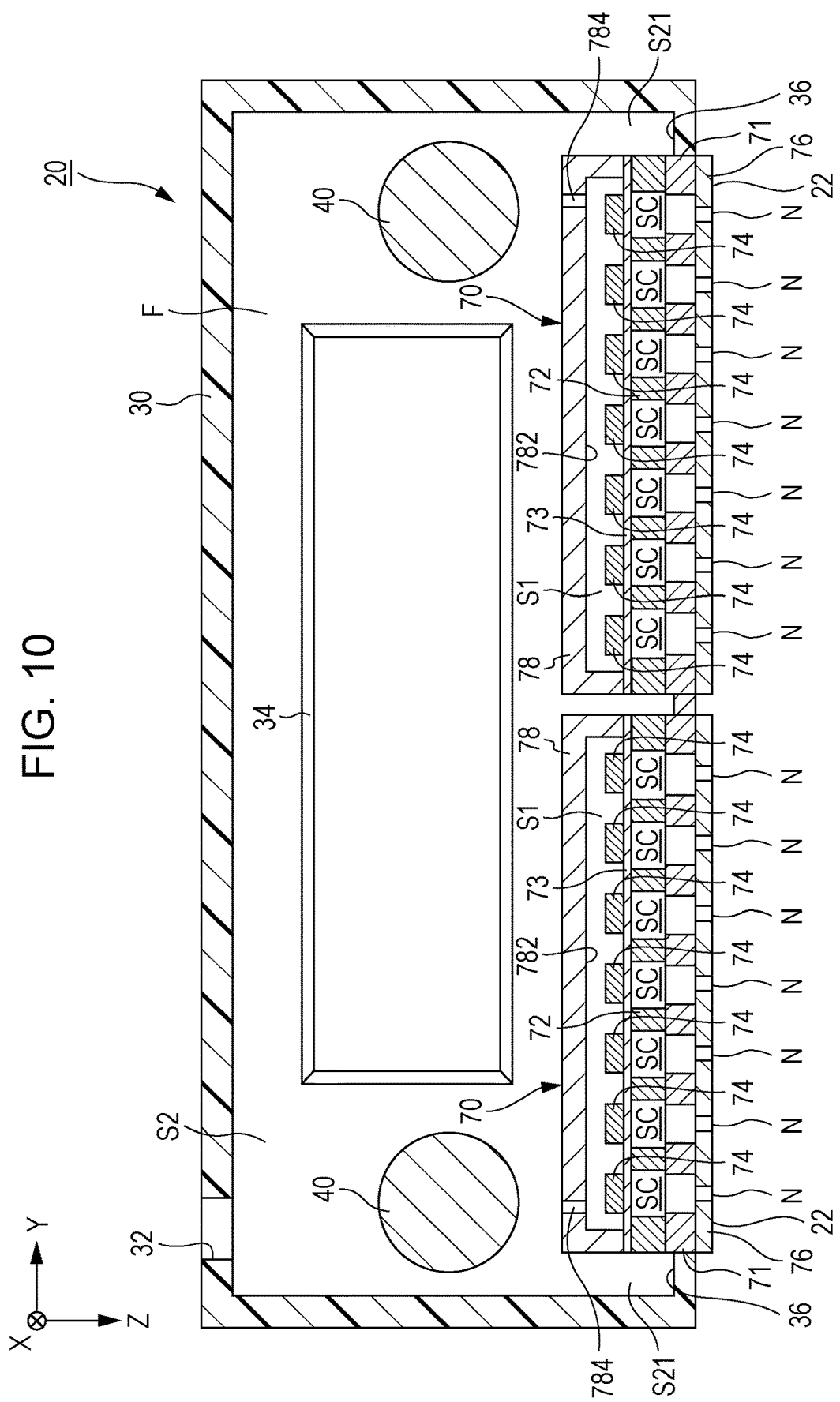
FIG. 10 is a sectional view showing a configuration of a liquid ejecting head according to a second embodiment.

FIG. 10 shows a sectional view of the configuration of the liquid ejecting head 20 according to the second embodiment and corresponds to FIG. 2. The liquid ejecting head 20 of FIG. 10 includes the two liquid ejection sections 70 in the second space S2. In FIG. 10, a case where the two liquid ejection sections 70 are arranged side by side in the Y-direction is presented as an example, but a plurality of the liquid ejection sections 70 may be arranged in a zigzag manner. The communication hole 784 of FIG. 10 is provided corresponding to each of the first spaces S1, and each of the first spaces S1 communicates with the second space S2. The moisture absorbent 40 of FIG. 10 is present in the second space S2, and one moisture absorbent 40 is provided in the vicinity of each of the communication hole 784.

In the liquid ejecting head 20 of the second embodiment with such a configuration, since entry of the moisture into each of the first space S1 from each of the communication holes 784 can be suppressed by the moisture absorbent 40 disposed in the second space S2, compared with the case where the second space S2 is provided for each of the first space S1 and the moisture absorbent 40 is disposed in each of the second space S2, the structure of the case member 30 can be simplified. Further, since the second space S2 becomes a common communication space to each of the first space S1, compared with the case where the second space S2 is provided for each of the first space S1, the volume of the second space S2 can be enlarged considerably. Therefore, the hygroscopic effect of the moisture absorbent 40 can be enhanced by increasing the moisture absorbent 40 disposed in the second space S2 easily.

Modification Example

The aspects and the embodiments described above can be modified variously. Specific modifications of aspects are presented below. Two or more aspects randomly selected from the aspects presented below and described above can be properly merged within a scope where the aspects do not contradict one another.

(1) In the embodiment described above, a serial head that causes the carriage 18 on which the liquid ejecting head 20 is mounted to reciprocate repeatedly in X-direction is presented as an example. However, the present disclosure is also applicable to a line head in which the liquid ejecting heads 20 are arranged over the entire width of medium 11.

(2) In the embodiment described above, the liquid ejecting head 20 of the piezoelectric type using the piezoelectric element that applies a mechanical vibration to the pressure chamber is presented as an example. However, it is also possible to adopt a thermal type liquid ejecting head using a heat generating element that generates the air bubbles inside the pressure chamber by heating.

(3) The liquid ejecting apparatus 10 exemplified by the embodiment described above can be adopted in various machines like a facsimile apparatus and a copy machine in addition to the machine specialized in printing. Use of the liquid ejecting apparatus 10 of the present disclosure is not limited to printing. For example, a liquid ejecting apparatus that ejects a solution of a coloring material is used as a manufacturing apparatus for forming a color filter of a liquid crystal display device, an organic electroluminescence (EL) display, a field emission display (FED), and the like. Further, a liquid ejecting apparatus that ejects a solution of a conductive material is used as a manufacturing apparatus for forming wirings and electrodes of the wiring substrate. It is also used as a chip manufacturing apparatus for ejecting a solution of bioorganic matter as a kind of liquid.

Further, in the embodiment described above, a liquid ejecting head and a liquid ejecting apparatus are presented as examples for description, but the present disclosure is widely applicable to precision instruments.

Examples of the precision instrument are a precision device with a built-in optical lens such as an endoscope, an industrial robot, a consumer robot, a cooking appliance with a liquid crystal panel and an organic EL panel, various electronic devices, electronic devices to which a display devices are applied in particular, an electronic device further mounted with an MEMS device, and the like.

Also, examples of the electronic device to which a display device is applied are a large screen television set, a computer monitor, a display-cum-lighting device, a mobile phone, a game machine, electronic paper, a driving operation panel, a video camera, a digital still camera, a viewfinder type video tape recorder, a direct-view type video tape recorder, a car navigation device, a pager, an electronic notepad, an electronic calculator, a word processor, a workstation, a video phone, a point of sale (POS) terminal, a device having a touch panel, and the like.

Also, examples of the MEMS device are a surface acoustic wave (SAW) device, an ultrasonic device, a motor, a pressure sensor, a pyroelectric element, and a ferroelectric element, and examples of the precision instrument mounted with the MEMS device are a SAW oscillator using a SAW device, an ultrasonic sensor using the ultrasonic device, a robot using the motor as a driving source, an IR sensor using the pyroelectric element, a ferroelectric memory using a ferroelectric element, and the like, and these are also within the technical scope of the present disclosure.

EXAMPLES

In the following, examples of the moisture absorbent 40 will be further described.

Example 1

A-type silica gel material is used as the desiccant powder 41*a* and mineral clay is used as the binder 41*b*. These are kneaded, and compressed and molded to form a tablet type solid moisture absorbent main body 41 to which an acrylic resin is used to form the moisture absorbent 40 with the coat layer 42.

As an acrylic resin coating method, a spray method, a dipping method, a brush coating method, or the like can be adopted. In the spray method, in addition to preparing an aqueous solution of an acrylic resin, a general purpose paint spray such as an aqueous versatile spray (made by Asahi Pen), an aqueous color spray (made by Nippe Home Products), an aqueous spray (Atom House Paint) can be used. Coating with such a spray coating makes it possible to coat a plurality of solid moisture absorbent main bodies 41 collectively and cost down of coating work is possible.

Also, in the dipping method, a commercially available aqueous coating material can be used. Examples of the aqueous coating material are the aqueous Super Coat (made by Asahi Pen), the aqueous ECO Aqua (made by Sunday Paint), the aqueous multipurpose EX (made by Asahi Pen), and the like.

The moisture absorbent 40 of the present example is excellent in water resistance and can be cleaned with pure running water after ultrasonic cleaning in pure water to be dried at 135° C. and ready for mounting on a precision instrument.

In the moisture absorbent 40 of the present example, even when the adhesive tape was stuck and peeled off, no dust was observed adhering to the adhesive tape.

Also, the moisture absorption property was 53 mg/h and the surface arithmetic roughness Ra was 12 μm.

Example 2

The allophane type clay (a mixture of silica gel and alumina) is used as the desiccant powder 41*a* and mineral clay is used as the binder 41*b*. These are kneaded, and compressed and molded to form the tablet type solid moisture absorbent main body 41 to which an epoxy resin is used to form the moisture absorbent 40 with the coat layer 42.

The formation of the coat layer 42 by the dipping method will be described with an example. When a general purpose epoxy-based adhesive is used as a coating resin, the solid moisture absorbent main body 41 is dipped in the adhesive, of which the viscosity is adjusted with a diluting liquid which is to become the main solvent, and is pulled up therefrom, so that the coat layer 42 can be formed on the surface of the solid moisture absorbent main body 41. After dipping, the moisture absorbent main body 41 is left on a non-woven fabric or a liquid absorbing material for a certain period of time, of which the length is adjusted to determine the thickness of the coat layer 42.

The moisture absorbent 40 of the present example is excellent in water resistance and can be cleaned with pure running water after ultrasonic cleaning in pure water to be dried at 135° C. and ready for mounting on a precision instrument.

In the moisture absorbent 40 of the present example, even when the adhesive tape was stuck and peeled off, no dust was observed adhering to the adhesive tape.

Also, the moisture absorption property was 30 mg/h and the surface arithmetic roughness Ra was 8 μm.

Example 3

An A-type silica gel material was used as the desiccant powder 41*a* and a water resistant resin was used as the binder 41*b*. These were kneaded and compressed and molded to form the tablet type solid moisture absorbent main body 41.

The solid moisture absorbent main body 41 is excellent in water resistance and can be cleaned with pure running water after ultrasonic cleaning in pure water to be dried at 135° C. and ready for mounting on a precision instrument.

The solid moisture absorbent main body 41 of the present example has a low dust rise property since one to two particles of dust adhere to the adhesive tape even when the adhesive tape is stuck and then peeled off.

Also, moisture absorption property is 80 mg/h, and the surface arithmetic roughness Ra is 14 μm.

What is claimed is:

1. A precision instrument comprising:
   a moisture absorbent in an internal space,
   wherein the moisture absorbent is a solid material of which a surface has a water resistance property, and
   wherein a coat layer is provided on the surface of the moisture absorbent, the coat layer having a water resistance property that is separate from the water resistance property of the surface of the absorbent material.

2. The precision instrument according to claim 1, wherein moisture absorption property of the moisture absorbent, which is mass increase amount when the moisture absorbent is left in an environment of 90% RH at 40° C., is 2 to 200 mg/h.

3. The precision instrument according to claim 1, wherein surface arithmetic roughness Ra of the surface of the moisture absorbent is 1 to 15 μm.

4. The precision instrument according to claim 1, wherein the moisture absorbent adheres to a resin member defining the internal space.

5. The precision instrument according to claim 1, wherein the moisture absorbent has a low dust rise property.

6. The precision instrument according to claim 1, further comprising:
   a liquid ejecting head provided with the internal space.

7. The precision instrument according to claim 1, wherein a coat layer is provided on the surface of the moisture absorbent, and
   the moisture absorbent adheres to a resin member defining the internal space.

8. The precision instrument according to claim 7, further comprising:
   a liquid ejecting head provided with the internal space.

9. The precision instrument according to claim 8, wherein the coat layer has a water resistance property higher than the moisture absorbent.

* * * * *